United States Patent [19]

Otani et al.

[11] 4,413,392
[45] Nov. 8, 1983

[54] METHOD OF MAKING TWO-STAGE CATALYTIC CONVERTER

[75] Inventors: Junji Otani, Oomiya; Yasuo Ikenoya, Kawagoe; Kanau Iwashita, Sakado, all of Japan

[73] Assignee: Honda Giken Kogyo Kabushiki Kaisha, Tokyo, Japan

[21] Appl. No.: 292,618

[22] Filed: Aug. 13, 1981

[30] Foreign Application Priority Data

Aug. 22, 1980 [JP] Japan .................................. 55-116230
Aug. 25, 1980 [JP] Japan .................................. 55-116741

[51] Int. Cl.³ .......................... B23P 15/00; F01N 3/10
[52] U.S. Cl. ..................................... 29/157 R; 29/446; 29/455 R; 29/458; 422/179; 427/282; 219/66; 219/119
[58] Field of Search ..................... 29/157 R, 458, 460, 29/446, 455 R; 228/214, 203; 181/244, 245, 227; 422/179, 180, 177; 427/282; 219/66, 119

[56] References Cited

U.S. PATENT DOCUMENTS

| 1,842,298 | 1/1932 | Smith | 228/214 |
|---|---|---|---|
| 2,264,524 | 12/1941 | Hale | 29/157 R |
| 2,365,181 | 12/1944 | Fentress | 219/66 |
| 2,613,015 | 10/1952 | Keating | 29/458 |
| 3,163,256 | 12/1964 | Lanning | 181/244 |
| 3,209,862 | 10/1965 | Young | 181/245 |
| 3,506,478 | 4/1970 | Hudson et al. | 427/282 |
| 3,937,617 | 2/1976 | Yaguchi | 422/179 |
| 3,969,083 | 7/1976 | Givens | 422/179 |
| 4,161,509 | 7/1979 | Nowak | 422/179 |
| 4,278,639 | 7/1981 | Tadokoro et al. | 422/180 |

FOREIGN PATENT DOCUMENTS

| 54-102414 | 8/1979 | Japan | 422/179 |
|---|---|---|---|
| 1136400 | 12/1968 | United Kingdom | 219/66 |

*Primary Examiner*—Daniel C. Crane
*Attorney, Agent, or Firm*—Lyon & Lyon

[57] ABSTRACT

A catalytic converter having two spaced catalyst elements is positioned between a front muffler and a rear muffler. Chrome plating of the mufflers does not adversely affect performance of the catalyst elements because welding of the mufflers to opposite ends of the catalytic converter is accomplished after the chrome plating step. Masking of the joinder areas before plating avoids blow holes at the welds, and silver paint is later applied to the areas which were masked. The catalytic converter is constructed by simultaneously pushing the two catalyst elements and flanged sleeves into opposite ends of the catalyst casing, using tapered guide rings and flanged pusher bars to squeeze peripheral cushions into place within the catalyst casing and around each of the catalyst elements. Welding electrodes are employed in combination with the flanged pusher bars to spot weld the catalyst casing to the flanged sleeves.

3 Claims, 6 Drawing Figures

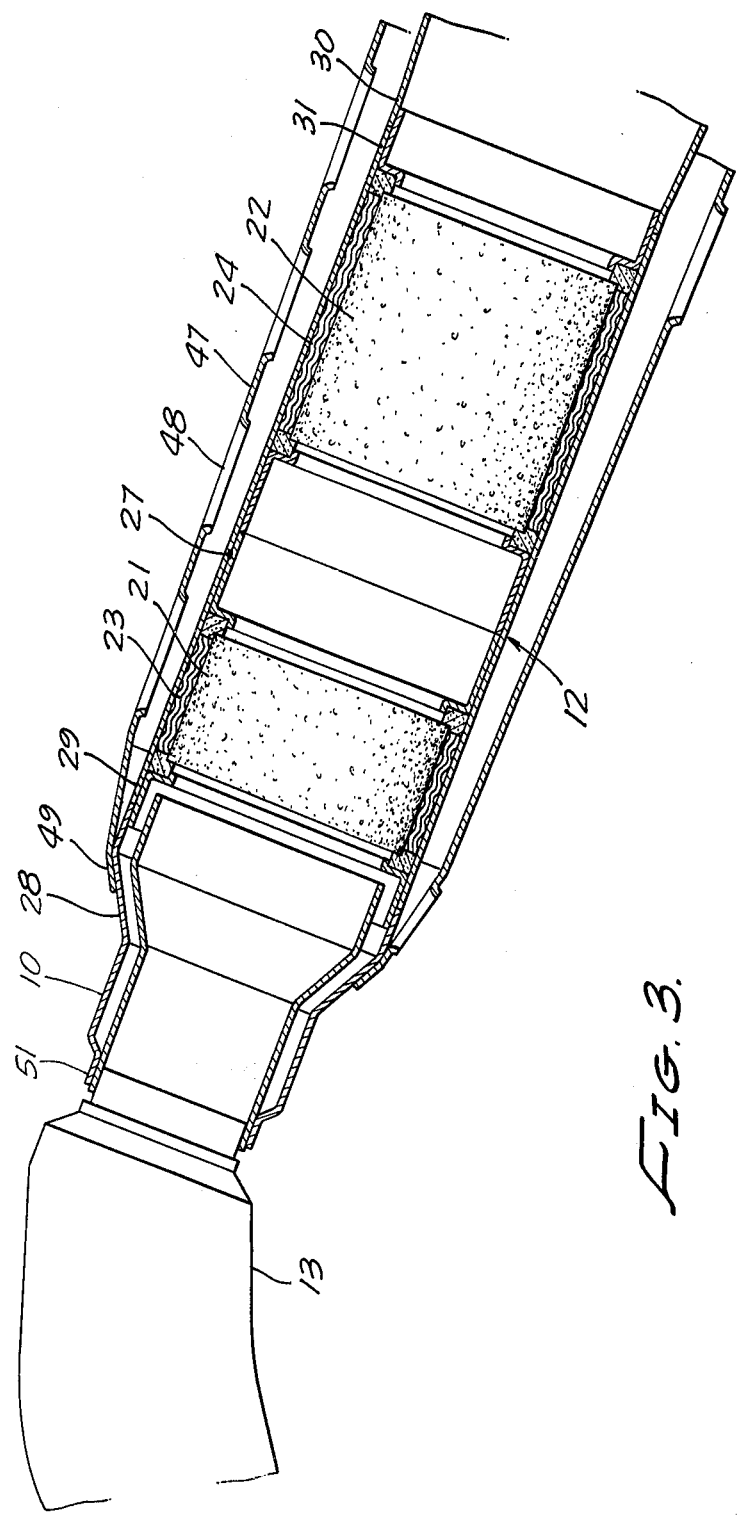

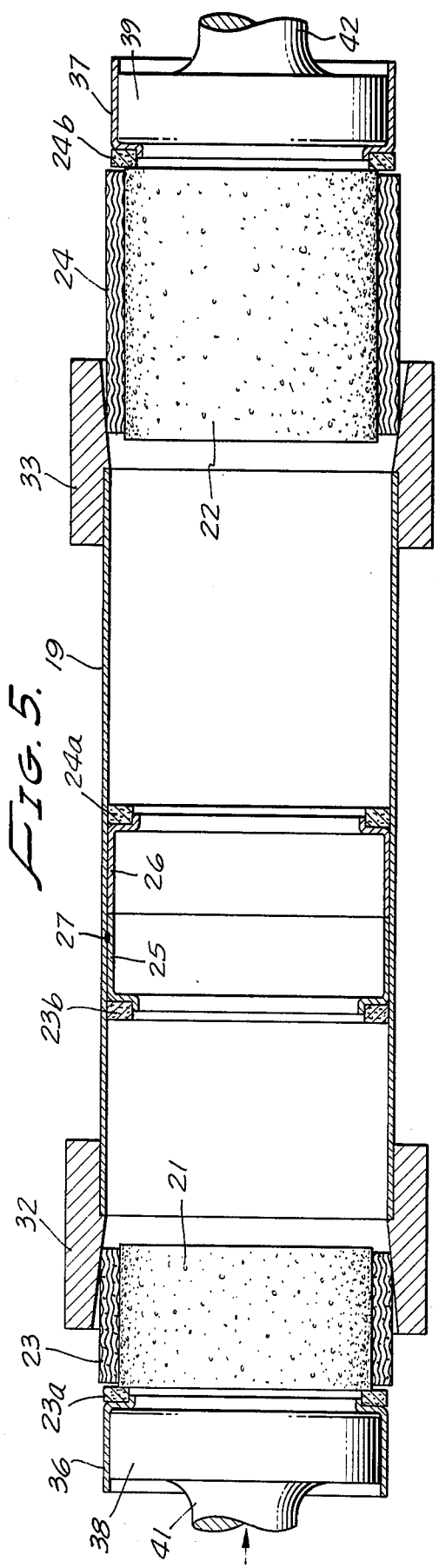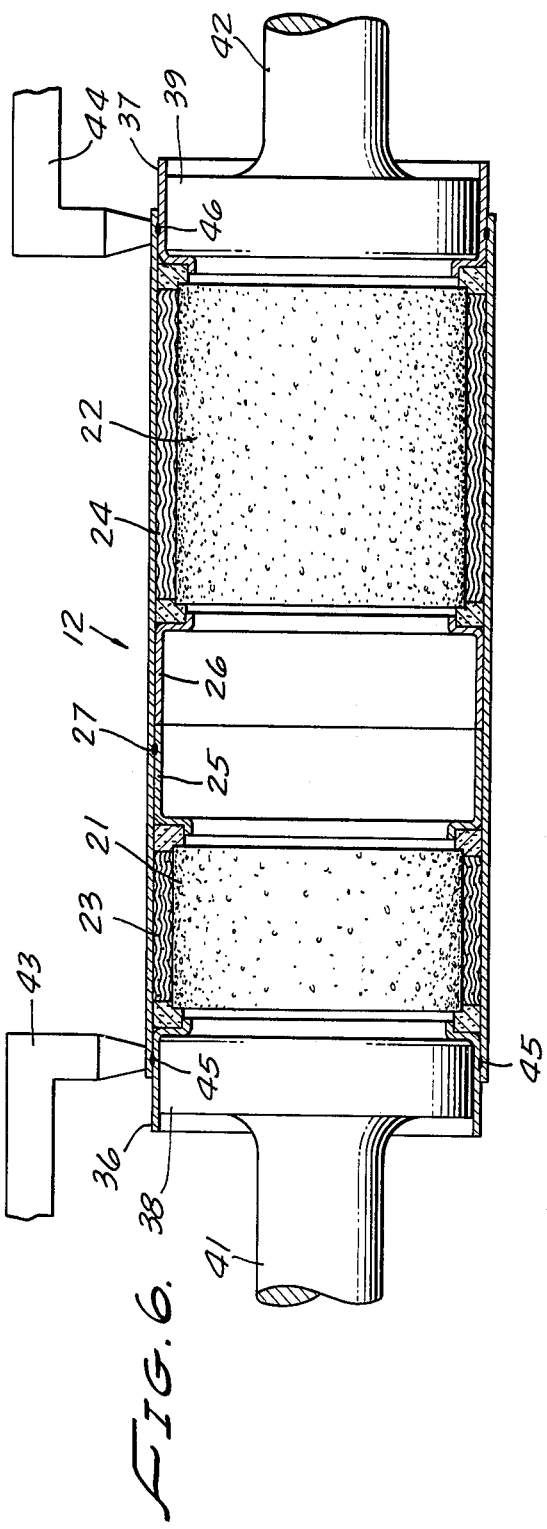

METHOD OF MAKING TWO-STAGE CATALYTIC CONVERTER

This invention relates to a method of making a two-stage catalytic converter interposed between two mufflers in the exhaust system for an internal combustion engine.

In the past, construction of such a device has involved steps to prevent chrome plating solution, or other surface treatment solution, from reaching the catalyst elements within the catalytic converter section, because of the deleterious effect of such plating solutions on the performance of the catalyst elements in service. Blocking of the entrance and exit of the mufflers and blocking of drain holes and any other openings was required prior to the plating operation.

An important object of the present invention is to provide a method of making the two-stage catalytic converter positioned between a front muffler and a rear muffler, which avoids the foregoing shortcomings, which method avoids any plating of the catalytic converter section.

In accordance with this invention, the catalytic converter section having catalyst elements spaced within a catalyst casing is prepared for installation between a front muffler and a rear muffler by surface treating the front muffler and the rear muffler except for areas adjacent the welds to be made, mounting tapered guide rings on opposite ends of the catalyst casing, and simultaneously pushing the two catalyst elements through the intermediary of flanged sleeves into opposite ends of the catalyst casing, by means of the tapered guide rings and flanged pusher bars to squeeze peripheral cushions into place within the catalyst casing and around the catalyst elements. Welding electrodes for resistance welding are then used in combination with the flanged pusher bars to spot weld the catalyst casing to the flanged sleeves, completing the construction of the catalytic converter section. The catalytic converter section is then welded into place between the front muffler and the rear muffler, the absence of plating near the welding joints improving the quality of the welds by minimizing the production of blow holes. Non-corrosive material, such as silver paint, is then applied to the areas adjacent the welds which were not chrome plated.

Other and more detailed objects and advantages will appear hereinafter.

In the drawings:

FIG. 3 is a view similar to FIG. 2 showing the parts fully assembled.

FIG. 5 is a sectional side elevation showing the parts at the beginning of a second step in the method of assembly.

FIG. 6 is a view similar to FIG. 5 showing parts in fully assembled position and resistance welding electrodes in position for joining certain of the metal parts.

Figure 1:
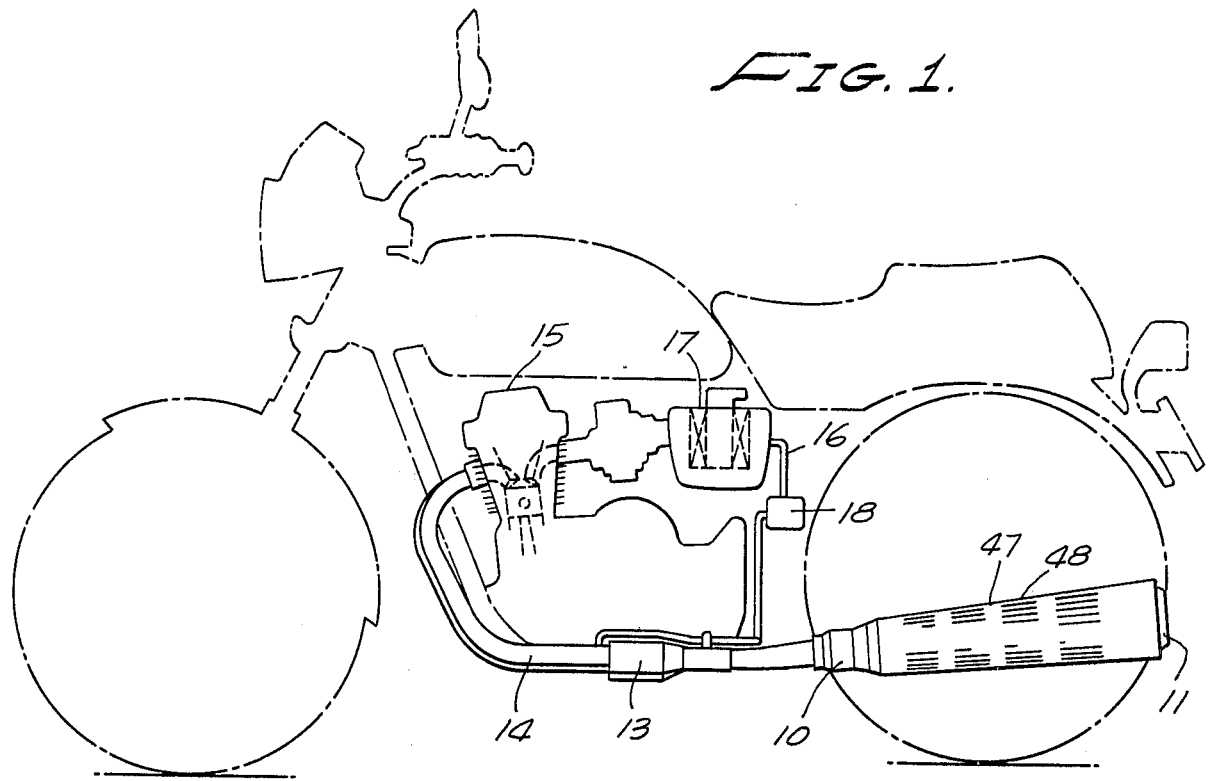
FIG. 1 is a side elevation showing a device constructed in accordance with the method of this invention, the outline of a motorcycle being shown in phantom lines.

Referring to the drawings, the apparatus constructed by the method of this invention includes a front muffler 10, a rear muffler 11, and a catalytic converter section 12 placed between them. The front muffler 10 receives exhaust gases from the exhaust pipe joint chamber 13. Exhaust pipes 14 connect the multi-cylinder internal combustion engine 15 to the exhaust pipe joint chamber 13. A second air feed pipe 16 connects the air cleaner 17 to the exhaust pipes 14 through the conventional reed valve 18. Pulsating exhaust pressures generated in the exhaust pipes by operation of the engine 15 causes the reed valve 18 to open and supply the catalytic converter section 12 with secondary air.

The catalytic converter section 12 includes a catalyst casing 19 formed of stainless steel or other heat-resisting steel, the casing being of hollow cylindrical shape open at the front and rear. Catalyst elements 21 and 22 are each encircled by peripheral cushions 23 and 24, respectively, which hold the elements 21 and 22 in place within the catalyst casing 19. Flanged metal sleeves 25 and 26 are mounted back-to-back within the catalyst casing 19 and at least one of them is fixed in position by welding 27. The catalyst element 21 is positioned adjacent the metal sleeve 25 and the catalyst element 22 is positioned adjacent the metal sleeve 26. End rings 23a, 23b, 24a and 24b engage the end surfaces of the catalyst elements 21 and 22, to prevent them from shifting axially.

The steps involved in one aspect of the method of this invention can be summarized as follows:

A. Masking material, not shown, is applied to the rear portion 28 of the front muffler 10 and to the adjoining front end portion 29 of the catalytic converter secion 12. Also, masking material is applied to the front portion 30 of the rear muffler 11 and to the rear portion 31 of the catalytic converter section 12. The masking material may be from 3 to 10 mm in thickness.

B. Chrome plating or other surface treatment is applied to the front muffler 10 and to the rear muffler 11, the masking material preventing such surface treatment from extending to the joints to be welded.

C. The masking material is removed.

D. The rear portion 28 of the front muffler 10 is welded to the forward end portion 29 of the catalytic converter section 12.

E. The front portion 30 of the rear muffler 11 is welded to the rear end portion 31 of the catalytic converter section 12.

F. The welded portions are coated with anti-corrosive paint, such as silver paint.

By reason of the foregoing steps in the method the plating solution or other treatment solution does not infiltrate into the catalytic converter section 12 to cause deterioration of the purification performance of the catalyst elements 21 and 22. Moreover, the masking of the areas next to the joint to be welded prevents deposit of chrome plating or other surface treatment, thereby avoiding the formation of blow holes which might otherwise develop during the welding operation, yielding higher weld strength. Also, with this improved method of this invention, it is not necessary to cover in advance drain holes of mufflers, inlets and outlets of exhaust gases, etc., thereby improving work efficiency for cost economy in production.

Figure 4:
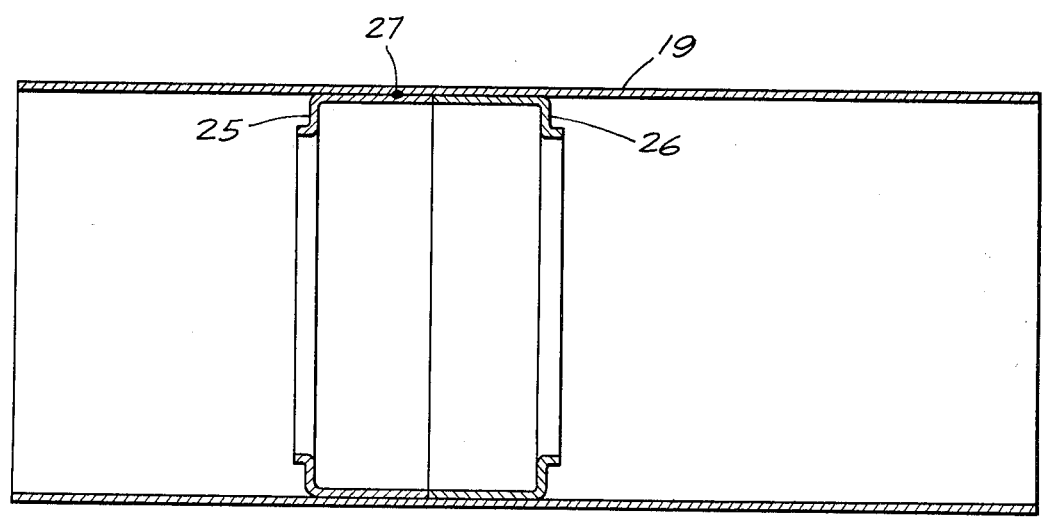
FIG. 4 is a sectional elevation showing the position of parts in a first step in the method of assembly.
Figure 2:
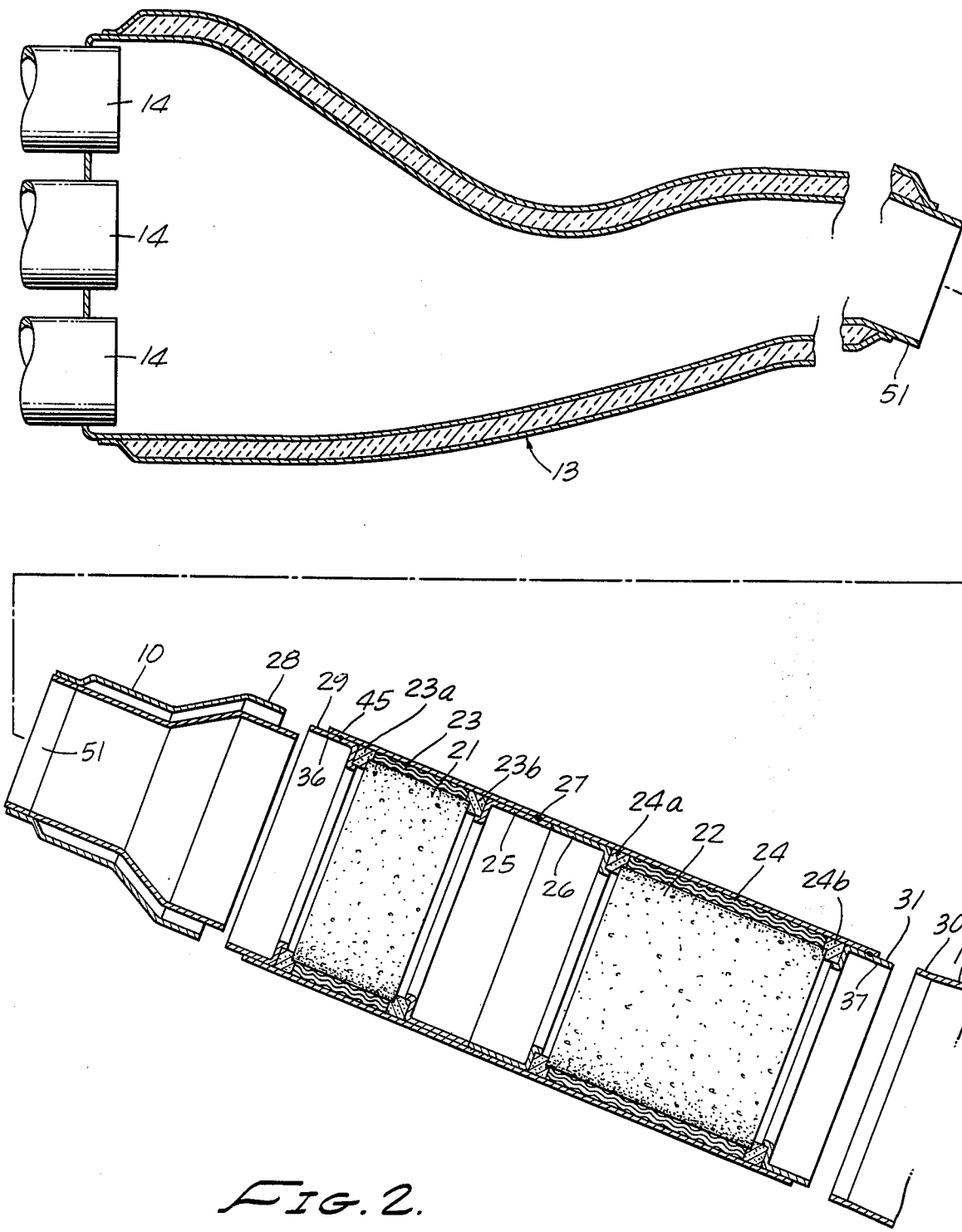
FIG. 2 is a sectional elevation showing a portion of the device constructed by the method of this invention.

In the construction of the catalytic converter section 12, the mechanical assembly steps in accordance with this invention are as follows:

1. Insert flanged sleeves 25 and 26 into the catalyst casing 19 (FIG. 4).

2. Weld at least one of the flanged sleeves to the casing 19, as shown at 27.

3. Insert the gasket rings 23b and 24a.

4. Mount tapered rings 32 and 33 on opposite ends of the casing 19 (FIG. 5).

5. Place flanged sheets 36 and 37 over enlarged ends 38 and 39 of pusher bars 41 and 42. Simultaneously push the two catalyst elements 21 and 22 and gasket rings 23a and 24b into opposite ends of the casing 19, using tapered guide rings 32 and 33 and flanged pusher bars 34 and 35 to squeeze the peripheral cushions 23 and 24 into place within the casing 19 and around the catalyst elements 21 and 22.

6. Remove the tapered guide rings 32 and 33.

7. Employ welding electrodes 43 and 44 in combination with the enlarged ends 38 and 39 to spot weld the catalyst casing 19 to the flanged sleeve 36, forming welds 45, and to spot weld the catalyst casing 19 to the flanged sleeve 37, forming welds 46.

8. Remove the pusher bars 41 and 42 with the enlarged ends 38 and 39, and remove the welding electrodes 43 and 44.

The catalytic converter section 12 is then ready for installation between the front muffler 10 and the rear muffler 11. The forward end 51 of the front muffler 10 is welded to the short pipe 52 which projects from the exhaust manifold 13. Joinder is accomplished by welding together the parts 28, 29 and the parts 30, 31. The chrome plated protector 47 having slits 48 is then installed and welded at its forward end 49 to the rear portion 28 of the front muffler 10.

Having fully described our invention, it is to be understood that we are not to be limited to the details herein set forth but that our invention is of the full scope of the appended claims.

We claim:

1. A method of assembling a catalytic converter having a cylindrical casing, catalyst elements, peripheral cushions about the catalyst elements and flanged sleeves to locate the catalyst elements in the casing, comprising the steps of mounting tapered guide rings on opposite ends of the cylindrical casing;

simultaneously pushing the catalyst elements with the peripheral cushions thereabout and the flanged sleeves, placed outwardly of the catalyst elements, into the opposite ends of the cylindrical casing by means of opposed flanged pusher bars, the tapered guide rings and the action of the flanged pusher bars squeezing the peripheral cushions into the casing and around the catalyst elements;

removing the tapered guide rings; and spot welding the flanged sleeves to the casing using the flanged pusher bars as welding electrodes in combination with additional welding electrodes outside of the cylindrical casing.

2. A method of assembling a catalytic converter having a cylindrical casing, catalyst elements, peripheral cushions about the catalyst elements and flanged central and end sleeves to locate the catalyst elements in the casing, comprising the steps of placing two flanged central sleeves back to back within the cylindrical casing;

mounting tapered guide rings on opposite ends of the cylindrical casing;

simultaneously pushing the catalyst elements with the peripheral cushions thereabout and flanged end sleeves, placed outwardly of the catalyst elements, into the opposite ends of the cylindrical casing by means of opposed flanged pusher bars, the tapered guide rings and the action of the flanged pusher bars squeezing the peripheral cushions into the casing and around the catalyst elements;

removing the tapered guide rings; and spot welding the flanged end sleeves to the casing using the flanged pusher bars as welding electrodes in combination with additional welding electrodes outside of the cylindrical casing.

3. A method of assembling a catalytic converter having a cylindrical casing, catalyst elements, peripheral cushions about the catalyst elements and flanged central and end sleeves to locate the catalyst elements in the casing, comprising the steps of placing two flanged central sleeves back to back within the cylindrical casing;

mounting tapered guide rings on opposite ends of the cylindrical casing;

placing central gasket rings on each flanged central sleeve so that said central gasket rings are in a position to contact catalyst elements to be installed in a subsequent step;

simultaneously pushing the catalyst elements with the peripheral cushions thereabout, two flanged end sleeves and two end gasket rings into the opposite ends of the cylindrical casing and into contact with the two central gasket rings placed on the flanged central sleeves by means of opposed, flanged pusher bars, the two flanged end sleeves and the two end gasket rings being placed outwardly of the catalyst elements, the tapered guide rings and the action of the flanged pusher bars squeezing the peripheral cushions into the casing and around the catalyst elements;

removing the tapered guide rings; and spot welding the flanged end sleeves to the casing using the flanged pusher bars as welding electrodes in combination with additional welding electrodes outside of the cylindrical casing.

* * * * *